United States Patent
Matta et al.

(10) Patent No.: US 11,136,022 B2
(45) Date of Patent: Oct. 5, 2021

(54) ROAD MARKER DETECTION METHOD

(71) Applicant: HITACHI AUTOMOTIVE SYSTEMS, LTD., Hitachinaka (JP)

(72) Inventors: Yukti Matta, Farmington Hills, MI (US); Kota Irie, Farmington Hills, MI (US); Taisetsu Tanimichi, Farmington Hills, MI (US)

(73) Assignee: HITACHI AUTOMOTIVE SYSTEMS, LTD., Hitachinaka (JP)

(*) Notice: Subject to any disclaimer, the term of this patent is extended or adjusted under 35 U.S.C. 154(b) by 240 days.

(21) Appl. No.: 15/991,421

(22) Filed: May 29, 2018

(65) Prior Publication Data

US 2019/0367012 A1 Dec. 5, 2019

(51) Int. Cl.
| | |
|---|---|
| *B60W 30/06* | (2006.01) |
| *G05D 1/02* | (2020.01) |
| *B60R 11/04* | (2006.01) |
| *G06T 7/73* | (2017.01) |
| *G01C 21/30* | (2006.01) |

(52) U.S. Cl.
CPC .......... *B60W 30/06* (2013.01); *G05D 1/0234* (2013.01); *G05D 1/0246* (2013.01); *G05D 1/0274* (2013.01); *B60R 11/04* (2013.01); *B60R 2300/307* (2013.01); *B60W 2420/42* (2013.01); *G01C 21/30* (2013.01); *G05D 1/0238* (2013.01); *G05D 1/0257* (2013.01); *G05D 1/0278* (2013.01); *G05D 2201/0213* (2013.01); *G06T 7/74* (2017.01)

(58) Field of Classification Search
None
See application file for complete search history.

(56) References Cited

U.S. PATENT DOCUMENTS

| | | | | |
|---|---|---|---|---|
| 4,890,233 | A  * | 12/1989 | Ando | G01C 21/08 |
| | | | | 701/530 |
| 8,301,325 | B2 | 10/2012 | Traster et al. | |
| 8,542,906 | B1 * | 9/2013 | Persson | G06Q 10/06 |
| | | | | 382/154 |
| 9,581,997 | B1 * | 2/2017 | Penilla | B60W 30/08 |
| 10,504,230 | B1 * | 12/2019 | Stahl | G06K 19/0614 |
| 2010/0060486 | A1 | 3/2010 | Nakashima et al. | |

(Continued)

FOREIGN PATENT DOCUMENTS

| | | |
|---|---|---|
| JP | 2009-122744 A | 6/2009 |
| JP | 2009-199572 A | 9/2009 |

OTHER PUBLICATIONS

Vivacqua, R., et al. "A Low Cost Sensors Approach for Accurate Vehicle Localization and Autononmous Driving Application", https://www.mdpi.com/journal/sensors; Oct. 16, 2017, pp. 1-33.

(Continued)

*Primary Examiner* — Rami Khatib
(74) *Attorney, Agent, or Firm* — Procopio, Cory, Hargreaves & Savitch LLP

(57) ABSTRACT

Example implementations as described herein are directed to the use and detection of asymmetrical markers in conjunction with an autonomous mode for a human operated vehicle system. In example implementations, the vehicle system adjusts at least one of a position, orientation and speed based on the detection of asymmetrical markers, which can be utilized for vehicle navigation as well as autonomous valet parking.

19 Claims, 18 Drawing Sheets

(56) References Cited

U.S. PATENT DOCUMENTS

| | | |
|---|---|---|
| 2014/0121964 A1 | 5/2014 | Stanley et al. |
| 2017/0032526 A1 | 2/2017 | Gao et al. |
| 2017/0075355 A1 | 3/2017 | Micks et al. |
| 2017/0267233 A1* | 9/2017 | Minster .................. B62D 15/02 |
| 2017/0297625 A1* | 10/2017 | Irion ..................... B60W 30/06 |
| 2018/0322653 A1* | 11/2018 | Tatarnikov ................ G06T 7/73 |
| 2019/0080612 A1* | 3/2019 | Weissman ............... G01C 21/28 |
| 2019/0362486 A1* | 11/2019 | Diao .................... G06K 9/4642 |

OTHER PUBLICATIONS

Office Action for related Japanese Application No. 12020-522109 dated Jul. 6, 2021 with Machine translation (5 pages).

* cited by examiner

| Marker ID | Marker Type | Map information | Operation Mode | Instructions | ... |
|---|---|---|---|---|---|
| M1 | T1 | MAP1 | O1 | I1 | ... |
| M2 | T2 | MAP2 | O2 | I2 | ... |
| M3 | T3 | MAP3 | O3 | I3 | ... |
| M4 | T4 | MAP4 | O4 | I4 | ... |
| ... | ... | ... | ... | ... | ... |

FIG. 6

ROAD MARKER DETECTION METHOD

BACKGROUND

Field

The present disclosure is directed to autonomous vehicle systems, and more specifically, to systems and methods involving road marker detection.

Related Art

Localization of autonomous vehicles has two primary challenges. The first is determining an appropriate foolproof sensor for map matching while ascertaining that the cost does not skyrocket. The second is dependence on wireless communication for map generation, such as satellite information. Generally for map-matching, sensors such as radars, sonars, LIDARs (Light Detection and Ranging) or stereo cameras are used to identify predetermined features in the environment, which are then compared against the map that may be commonly obtained from a GPS (Global Positioning Satellite) unit. However, using such sensors eliminates the possibility of detecting two dimensional colored features most commonly found in the environment. In addition, satellite communication can be inconsistent in the presence of tall buildings leading to unstable and inaccurate location results of the vehicle. To solve the aforementioned issues, several related art implementations have been proposed.

In one example related art implementation, there is a parking assistance system that makes use of a marker. Such systems use a symmetrical marker which is recognized by a front-facing camera mounted on the car to park in and exit out of a garage. However, the difficulty with this approach is that a vehicle can only park head-in into a parking space since the camera is forward facing. In addition, since the marker used is symmetrical, at least three feature points need to be detected for the system to recognize it successfully.

In another example related art implementation, there is a camera system calibration for determining the position of the vehicle. Such related art implementations utilize predetermined markers, the shape parameters of which are stored in a computer readable memory. From the camera frames, the shapes are extracted and then compared with the stored shapes. Using rotation and translation, the position of the vehicle can determined. The difficulty with such approaches is the requirement of additional resources in terms of computer Random Access Memory (RAM).

In another related art implementation, there is an approach in which the markers are placed at the four corners of the designated parking space. The markers are used to help the vehicle park into the space using features from the pattern of the marker. However, this approach limits the localization of the vehicle only when it is close to the parking space due to detection distance capability of any camera. This invention involves an approach in which the markers are placed at the entrance of the parking lot and along the trajectory followed by the car ensuring localization and trajectory correction of the vehicle in the entire parking lot.

SUMMARY

Example implementations described herein involve using an asymmetrical marker which is recognized by a plurality of cameras (e.g., surround eye cameras) and is hence not limited to recognition only in the front of the vehicle. Additionally, due to the use of a map positioning unit, the system of the example implementations does not depend on any vehicle guidance system which can thereby reduce cost.

Example implementations as described herein utilize a template matching method to recognize the marker. In example implementations, the template can be created in real-time and does not need to be stored beforehand.

In Autonomous Valet Parking (AVP), vehicle trajectory during navigation depends on localization efficiency. To counter the issues in the methods described above, a marker detection method is proposed for localizing the autonomous vehicle in the parking lot. This makes use of an asymmetrical marker which is recognized by a surround eye camera system to achieve localization without the use of GPS.

In an example implementation involving AVP, the markers are placed at the entrance of the parking lot and along the trajectory. The location of the marker recognized by the cameras is compared with that on a map provided by an offline map positioning unit. The cameras utilize image processing functions, to calculate the position and the orientation of the vehicle with respect to these markers. This information is provided to the Autonomous Driving Electronic Control Unit (AD ECU) in the vehicle via CAN (Controller Area Network). Prior to this, the Electronic Control Unit (ECU) also receives the expected initial position and orientation of the vehicle from the map positioning unit. The difference between the expected and current coordinates of the vehicle is then calculated by the ECU and used for trajectory correction. This technique is useful to localize one independent vehicle however in the presence of another preceding vehicle, there needs to be a common control center that would control the movement of all the vehicles in the parking lot to avoid any collisions. Such example implementations involve the use of a telematics control unit which communicates the position of the vehicle to the control center real-time. The control center in turn ensures that no two vehicles are in close proximity by sending commands to the following vehicle to stop in case of a potential collision.

Aspects of the present disclosure include a method that involves detecting, from a plurality of cameras, one or more markers having an asymmetrical shape; and changing an operation mode from a human operated mode to an autonomous mode for a vehicle, the autonomous mode configured to adjust at least one of a position, orientation, and speed of the vehicle based on the detected one or more markers.

Aspects of the present disclosure further include a computer program that involves detecting, from a plurality of cameras, one or more markers having an asymmetrical shape; changing an operation mode from a human operated mode to an autonomous mode for a vehicle, the autonomous mode configured to adjust at least one of a position, orientation, and speed of the vehicle based on the detected one or more markers. The computer program may be stored on a non-transitory computer readable medium and executed by one or more hardware processors.

Aspects of the present disclosure can include a system that involves means for detecting, from a plurality of cameras, one or more markers having an asymmetrical shape; and means for changing an operation mode from a human operated mode to an autonomous mode for a vehicle, the autonomous mode configured to adjust at least one of a position, orientation, and speed of the vehicle based on the detected one or more markers.

Aspects of the present disclosure can include a system that involves a plurality of cameras; and a processor, configured to detect, from the plurality of cameras, one or more markers having an asymmetrical shape; and change an operation mode from a human operated mode to an autonomous mode for a vehicle, the autonomous mode configured to adjust at least one of a position, orientation, and speed of the vehicle based on the detected one or more markers.

BRIEF DESCRIPTION OF DRAWINGS

FIG. 6 illustrates example management information that can be utilized by a management apparatus and/or the vehicle system.

DETAILED DESCRIPTION

Figure 1A:
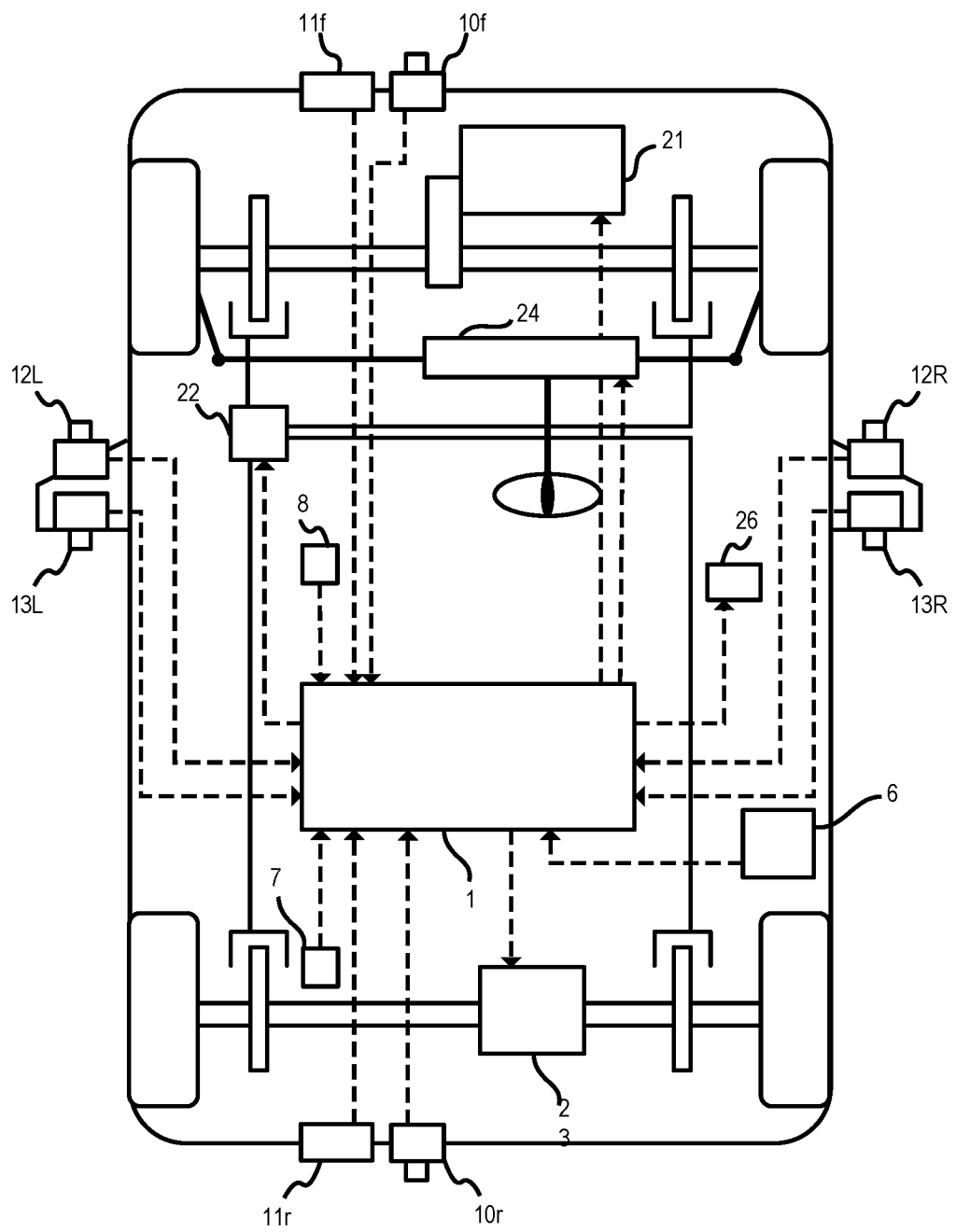
FIG. 1(a) illustrates a vehicle system, in accordance with an example implementation.

The following detailed description provides further details of the figures and example implementations of the present application. Reference numerals and descriptions of redundant elements between figures are omitted for clarity. Terms used throughout the description are provided as examples and are not intended to be limiting. For example, the use of the term "automatic" may involve fully automatic or semi-automatic implementations involving user or administrator control over certain aspects of the implementation, depending on the desired implementation of one of ordinary skill in the art practicing implementations of the present application. Selection can be conducted by a user through a user interface or other input means, or can be implemented through a desired algorithm. Example implementations as described herein can be utilized either singularly or in combination and the functionality of the example implementations can be implemented through any means according to the desired implementations. The term "vehicle" and "vehicle system" may also be utilized interchangeably.

FIG. 1(a) illustrates a vehicle system, in accordance with an example implementation. Specifically, FIG. 1(a) illustrates an example human operated vehicle system configured to operate in a human operated mode and an autonomous mode. The AD ECU 1 is connected to a map positioning unit 6 to receive signals from the map positioning unit 6. Those signals represent a set route, map data, the position of the vehicle on a map, the direction of the vehicle, lane information, such as the number of lanes, speed limit, and types of roads/vehicle locations (e.g., highways and general motorways, branch roads, toll booths, parking lots or garages, etc.).

The vehicle is provided with an operation parameter measuring unit for measuring values of parameters indicating the operating condition of the vehicle, which can include wheel speed measuring device 7, and vehicle behavior measuring device 8. Signals provided by those devices are sent to the AD ECU 1. The vehicle behavior measuring device 8 measures longitudinal acceleration, lateral acceleration and yaw rate.

The vehicle is provided with environmental condition measuring devices for measuring conditions of the environment around the vehicle, including a front camera 10f, a front radar 11f, a rear camera 10r, a rear radar 11r, a left front camera 12L, a right front camera 12R, a left rear camera 13L and a right rear camera 13R. Those environmental condition measuring devices send information about lane marks, obstacles, and asymmetrical markers around the vehicle to the AD ECU 1.

The cameras of the vehicle can be in the form of surround eye cameras, or other cameras depending on the desired implementation. In the camera system of the vehicle, the front camera 10f is provided with an image pickup unit for obtaining an image of one or more asymmetrical markers around the vehicle, and an output unit that provides signals representing the positional relation between the vehicle and the one or more asymmetrical markers. The front radar 11f detects and locates other vehicles and pedestrians and provides signals representing positional relation between the vehicle and those objects. The rear camera 10r, the left front camera 12L, the right front camera 12R, the left rear camera 13L and the right rear camera 13R are similar in functionality to the front camera 10f, and the front radar llf and the rear radar 11r.

The vehicle is provided with an engine 21, an electronically controlled brake system 22, an electronically controlled differential mechanism 23, and an electronically controlled steering system 24. The AD ECU 1 gives drive signals to actuators included in those systems 22, 23 and 24 on the basis of values of manipulated variables given by the driver and/or environmental conditions such as the detection of asymmetrical markers or engagement of various autonomous modes for the vehicle system as described herein. When the vehicle needs to be accelerated, the controller 1 gives an acceleration signal to the engine 21. When the vehicle needs to be decelerated, the controller gives a deceleration signal to the electronically controlled brake system 22. When the vehicle needs to be turned, the AD ECU 1 gives a turn signal to at least one of the electronically controlled brake system 22, the electronically controlled differential mechanism 23 and the electronically controlled steering system 24.

The electronically controlled brake system 22 is a hydraulic brake system capable of controlling individual braking forces respectively applied to the wheels. The electronically controlled brake system applies braking forces to either the right wheels or the left wheels in response to a turning request to apply a yawing moment to the vehicle. The electronically controlled differential mechanism 23 drives an electric motor or a clutch to generate a torque difference between the right axle and the left axle in response to a turning request to apply a yawing moment to the vehicle. The electronically controlled steering system 24 is, for example, a steer-by-wire steering system capable of correcting the steering angle independently of the turning angle of the steering wheel in response to a turning request to apply a yawing moment to the vehicle.

The vehicle is provided with an information output unit 26. The information output unit 26 displays images, generates sounds and turns on warning lights representing information about supporting operations according to the type of the driving support operation. The information output unit 26 is, for example, a monitor provided with a built-in loud speaker. Plural information output units may be installed in the vehicle.

The system as illustrated in FIG. 1(a) is an example implementation of the vehicle system as described herein, but other configurations are also possible and fall within the scope of the example implementations, and the present disclosure is not limited to the configuration as illustrated in FIG. 1(a). For example, cameras may be installed on the top or the roof of the vehicle for the purposes of detecting asymmetrical markers that are placed on walls, road signs, billboards and so on.

Figure 1B:
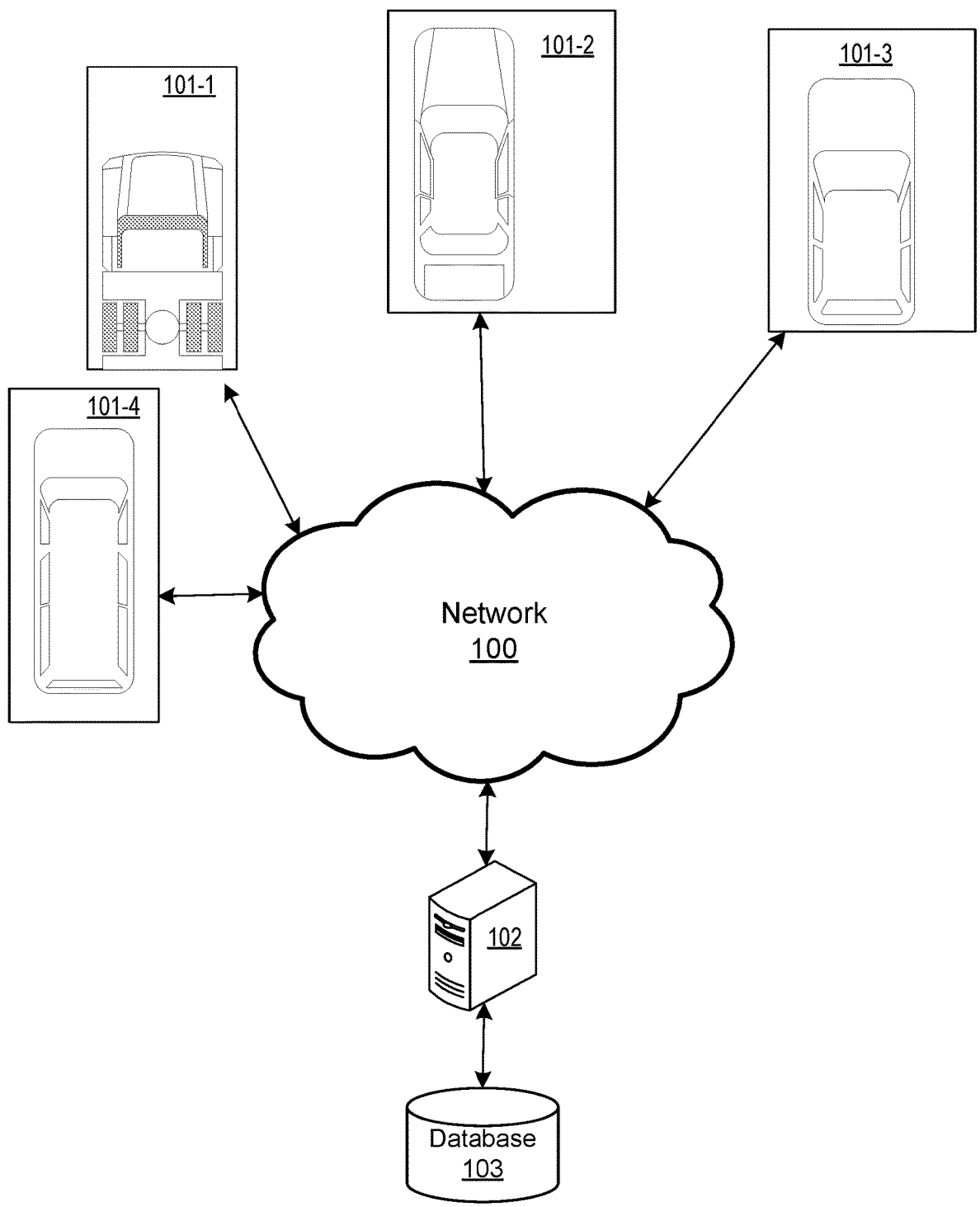
FIG. 1(b) illustrates a plurality of vehicle systems and a management apparatus, in accordance with an example implementation.

FIG. 1(b) illustrates a plurality of vehicle systems and a management apparatus, in accordance with an example implementation. One or more vehicle systems 101-1, 101-2, 101-3, and 101-4 as described with respect to FIG. 1(a) are communicatively coupled to a network 100 which is connected to a management apparatus 102. The management apparatus 102 manages a database 103, which contains data feedback aggregated from the vehicle systems in the network 100. In alternate example implementations, the data feedback from the vehicle systems 101-1, 101-2, 101-3, and 101-4 can be aggregated to a central repository or central database such as proprietary databases that aggregate data from systems such as enterprise resource planning systems, and the management apparatus 102 can access or retrieve the data from the central repository or central database. Such vehicle systems can include human operated vehicles such as cars, trucks, tractors, vans, and so on depending on the desired implementation.

Figure 4A:
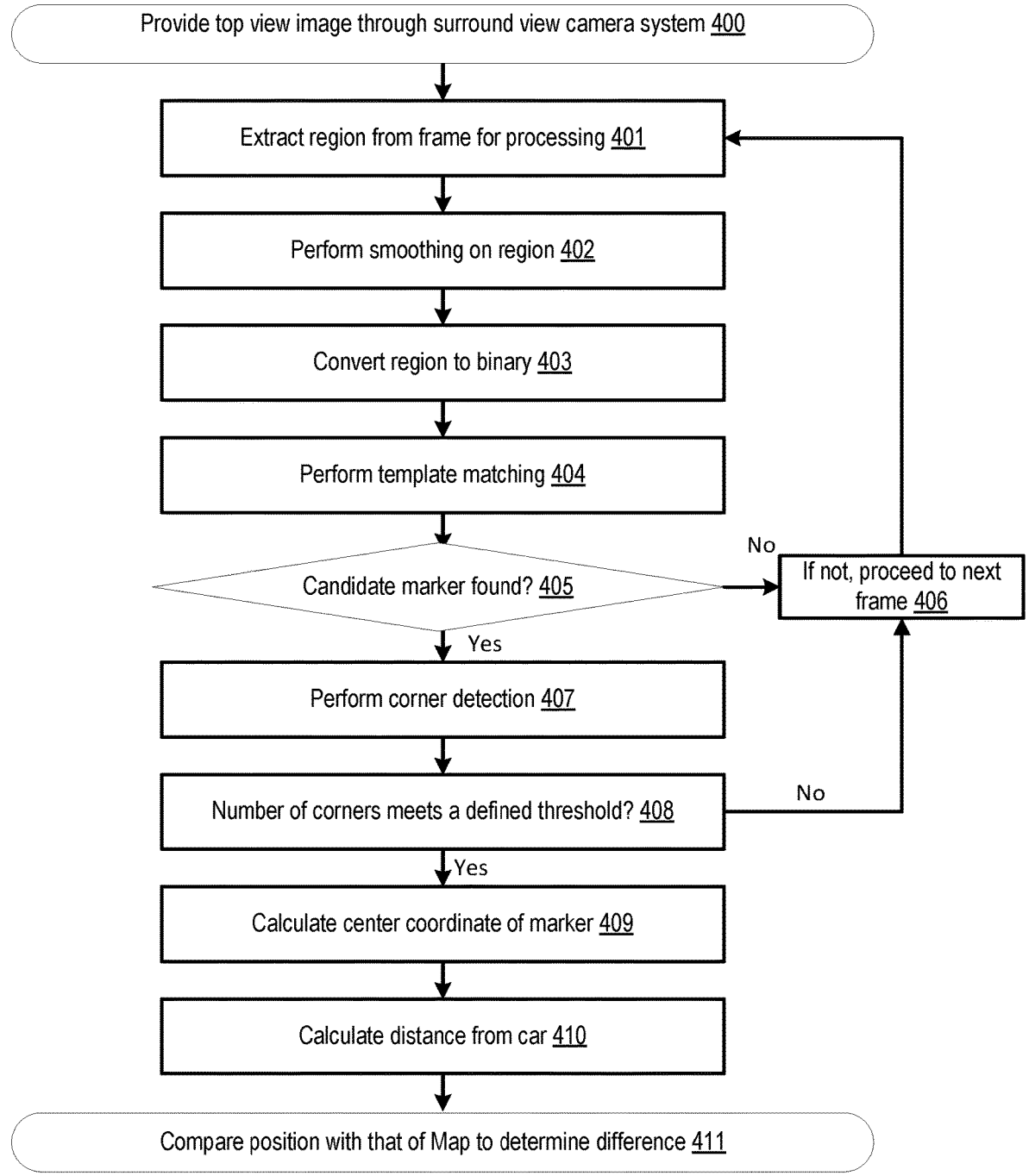
FIGS. 4(a) to 4(d) illustrate example flow diagrams that can be executed by the vehicle system or the management apparatus.

Management apparatus 102 can be configured to receive position information from vehicle systems 101-1, 101-2, 101-3, and 101-4 which transmit the position of the corresponding vehicle system relative to a marker as described in FIG. 4(a), and further configured to transmit instructions to the vehicle systems 101-1, 101-2, 101-3, 101-4 that are indicative of a trajectory for the vehicle until a next marker, and/or to adjust an operation mode, position, speed, and/or orientation.

FIGS. 2(a) to 2(d) illustrate examples of asymmetrical markers, in accordance with an example implementation. The unique features of the checker pattern markers selected make it conducive for recognition using cameras in the vehicle systems as illustrated in FIG. 1(a). The difference in intensity of the white and black squares not only makes it easy to detect the point of transition as a corner using detection algorithms such as the Harris Corner Detector, but also makes it possible for the marker to be detected in highly variable light conditions. Markers may be physically painted or otherwise placed on streets, signs or walls, or can be projected/displayed by projection systems, monitors and so forth for modification depending on the desired implementation.

Figures 2A, 2B:
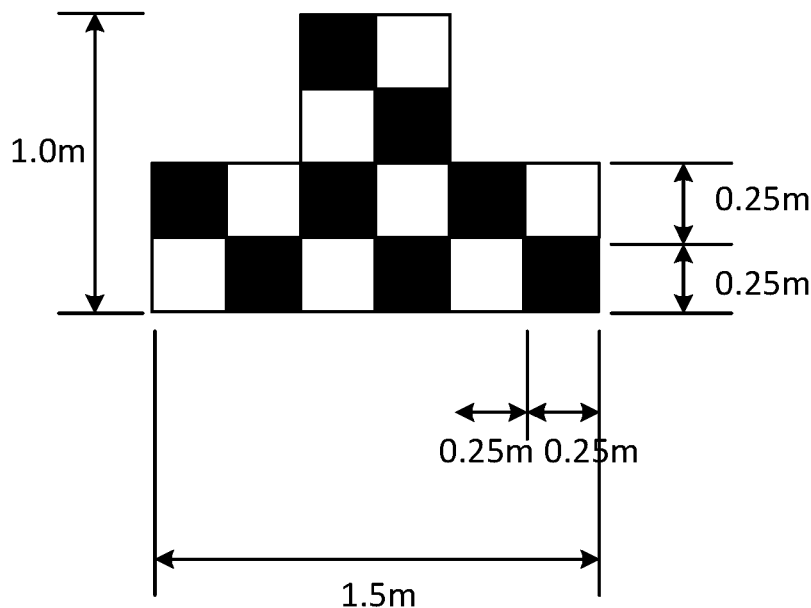
FIGS. 2(a) to 2(e) illustrate examples of asymmetrical markers, in accordance with an example implementation.
Figure 2C:
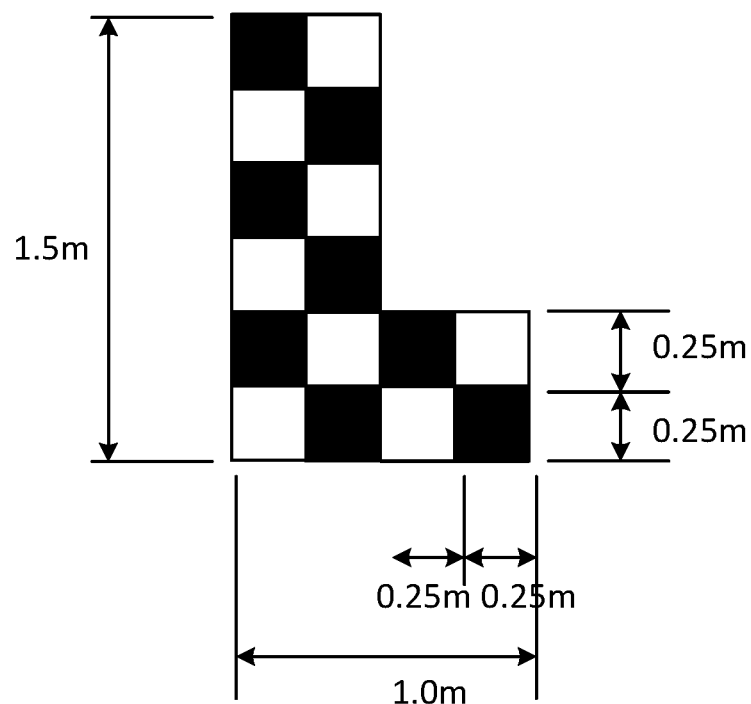

In example implementations, asymmetrical markers such as T-shaped markers as illustrated in FIG. 2(a) are utilized in determining if the vehicle is travelling in the expected direction (i.e. the vehicle travels in the direction of the inverted T of Type ID 1 from FIG. 2(b)). Each of the T-shaped markers may also be associated with an identifier, or ID which represent different functionalities. However, the present disclosure is not limited to the use of a T-shaped marker; other asymmetrical markers such as an L-shaped marker as shown in FIG. 2(c) can also be utilized. Further, although example dimensions are illustrated in FIGS. 2(a) to 2(c), such markers can also be resized according to the desired implementation. Thus, any asymmetrical checker pattern marker can be used in example implementations.

Figure 2D:
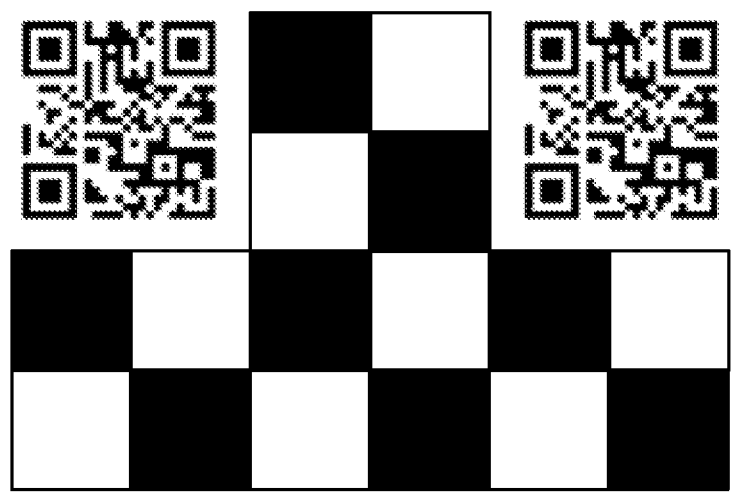

If recognition information obtained from the cameras suggests that the vehicle is oriented incorrectly with the respect to the marker, the AD ECU corrects the trajectory as deemed necessary. The current system makes use of local coordinates detected by the cameras and converts them to global coordinates by comparison with a map of the location (or parking lot). Depending on the desired implementation, the system can also function with a QR (Quick Response) code placed on the marker as shown in FIG. 2(d). For example, the QR code can include the latitude and longitude information of the marker. Once detected by the cameras, global coordinates of the vehicle can be available instantly.

Figure 2E:
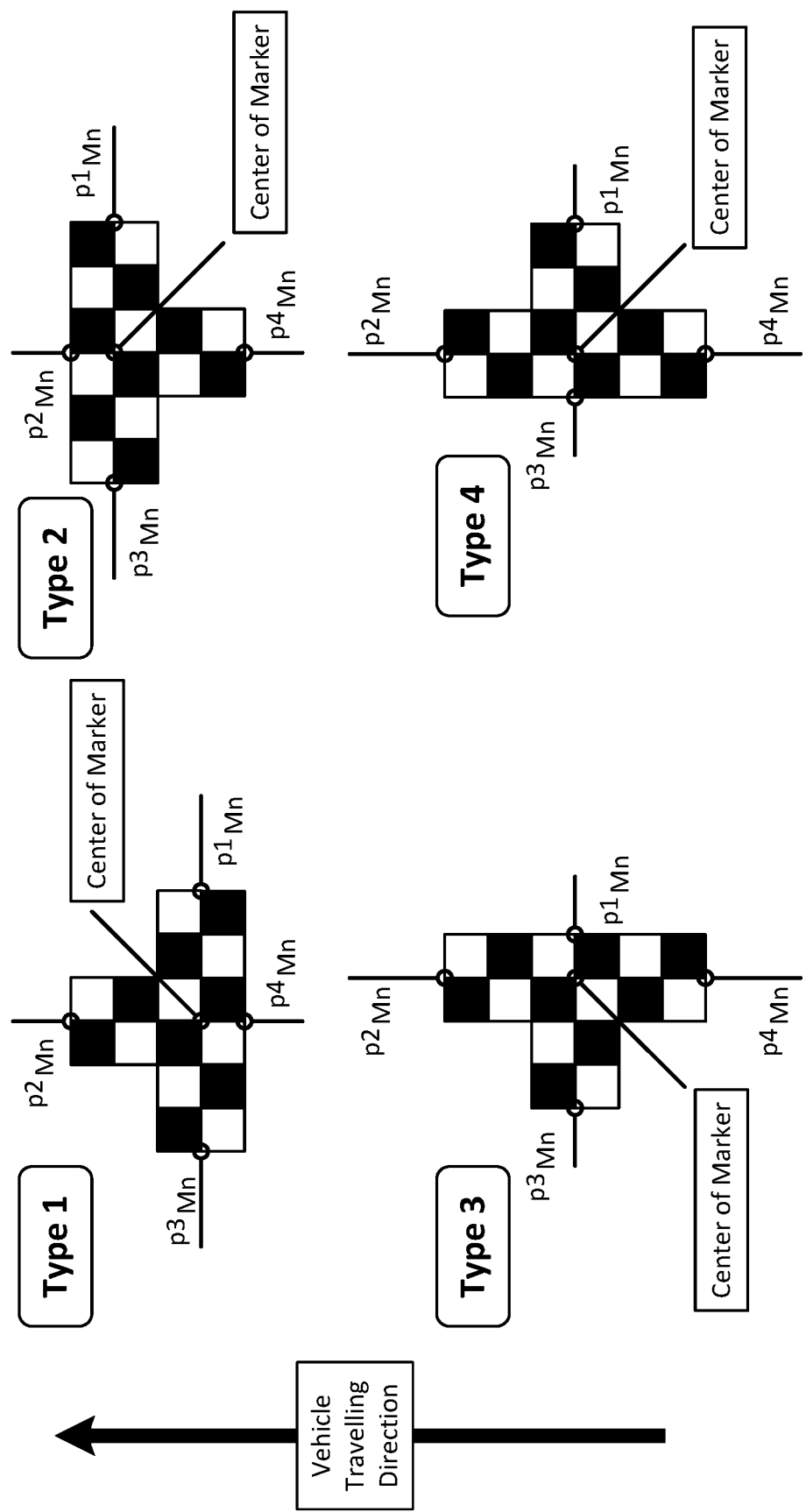

FIG. 2(e) illustrates an example implementation of markers for utilization at the entrance of a parking lot, in accordance with an example implementation. At the entrance of the parking lot, four markers are placed, one along every side of the car, each rotated progressively by 90 degrees in the clockwise direction, as shown in FIG. 2(e). The position of the markers is such that under 0 degree rotation condition, the axis of the marker and the optical axis of the camera align. Peripheral coverage of the camera view may be less sharp compared to the center of the camera image. The location of the markers makes sure to leverage such sharpness. Every marker on is assigned an ID as illustrated in FIG. 2(b), which makes it possible for the ECU to determine which camera identified the marker and thereby establishes its correctness. The markers are also placed along the route followed by the car to the parking space.

Figures 2F, 2G:
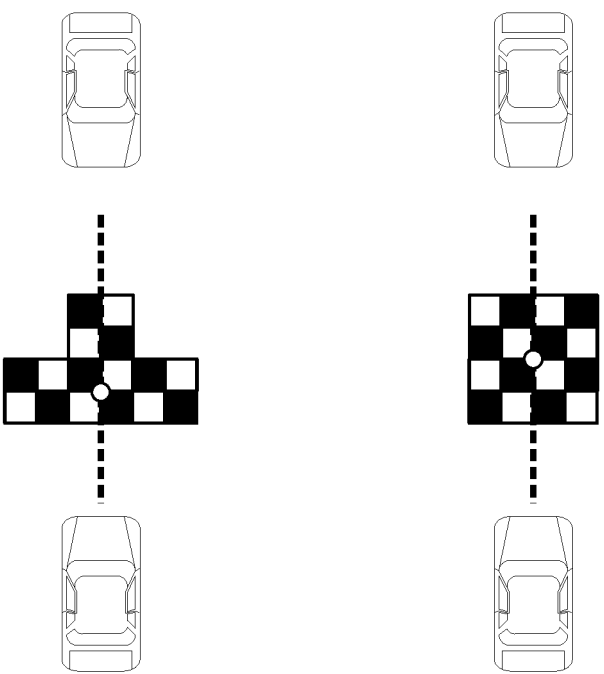
FIGS. 2(f) and 2(g) illustrate a comparison between asymmetrical markers and symmetrical markers.

FIGS. 2(f) and 2(g) illustrate a comparison between an asymmetrical marker and a symmetrical marker. Specifically, FIG. 2(f) illustrates an asymmetrical marker and FIG. 2(g) illustrates a symmetrical marker example. In example implementations, asymmetrical markers are utilized as the direction of approach can be distinguished from a 0 degree orientation versus a 180 degree orientation as illustrated in FIG. 2(f). In contrast, if the marker is symmetrical as illustrated in FIG. 2(g), the direction of approach cannot be distinguished from the 0 degree orientation versus the 180 degree orientation. Thus, in example implementations, asymmetrical markers are utilized for ease of detection as well as for determining orientation of the vehicle with respect to the marker.

Further, although checker patterns are utilized in the example implementations, the present disclosure is not limited thereto and any other patterns can be utilized according to the desired implementation as long as the marker is asymmetrical. For example, zig-zag patterns, a marker involving a circle or other shape indicating the center of the marker, QR codes or bar codes embedded within the marker can also be utilized.

Figure 3A:
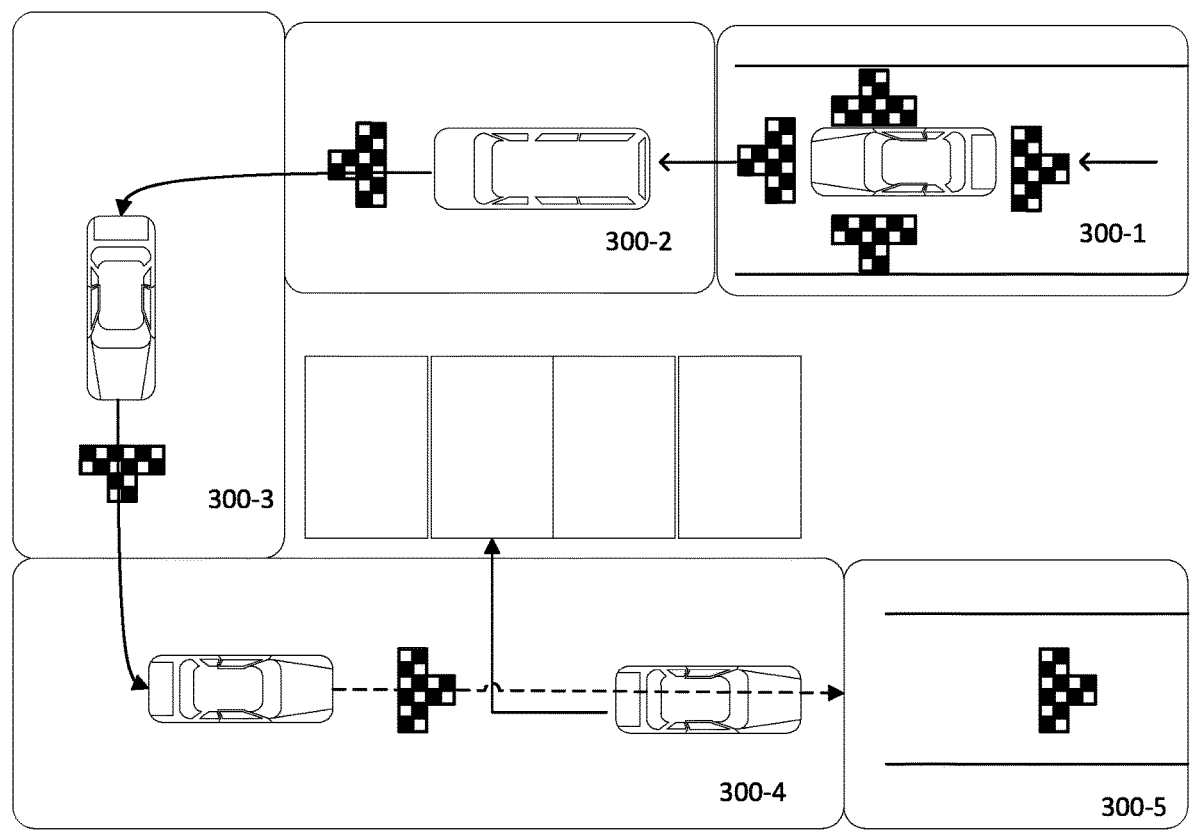
FIGS. 3(a) to 3(d) illustrate example use cases of asymmetrical markers, in accordance with an example implementation.

FIG. 3(a) illustrates an example implementation involving a parking lot. These markers are also assigned an ID and compared with those stored in the map positioning unit. These markers help the car continuously correct its trajectory lest the deviation from the desired path exceeds a certain threshold. Not only does the map positioning unit receive these coordinates but also the control center which then decides if it is safe for the vehicle to proceed based on comparison with coordinates received from other vehicles in the parking lot as shown in FIG. 3(a).

As shown in FIG. 3(a), the parking lot can be divided into several sections by the map positioning unit, based on the location of the markers. In the example of FIG. 3(a), the parking lot is considered to have sections 300-1, 300-2, 300-3, 300-4, and 300-5. Section 300-1 is the entrance way to the parking lot in which a vehicle can be dropped off and the AVP mode can be engaged. In an example implementation, the AVP mode can be engaged upon receiving an instruction from a management apparatus or from instructions stored in the vehicle system after the vehicle system detects an initial marker. In another example implementation, the human operator of the vehicle system can manually engage the AVP mode, whereupon the vehicle will operate through the parking lot autonomously. As illustrated in FIG. 3(a), the vehicle will navigate along a trajectory based on the instructions through various sections of the parking lot until it encounters a marker that instructs the vehicle to either adjust the trajectory as illustrated in sections 300-2 and 300-3, or engage automatic parking as illustrated in section 300-4. When the parked vehicle needs to be retrieved, instructions from management apparatus 102 of FIG. 1(b) can be transmitted to the parked vehicle, wherein the vehicle can be changed to a retrieval mode in which the vehicle is guided to a marker indicative of a pick-up location as illustrated in section 300-5. The vehicle then stops in proximity to the marker indicative of a pick-up location, whereupon a human operator can retrieve the vehicle.

Figure 3B:
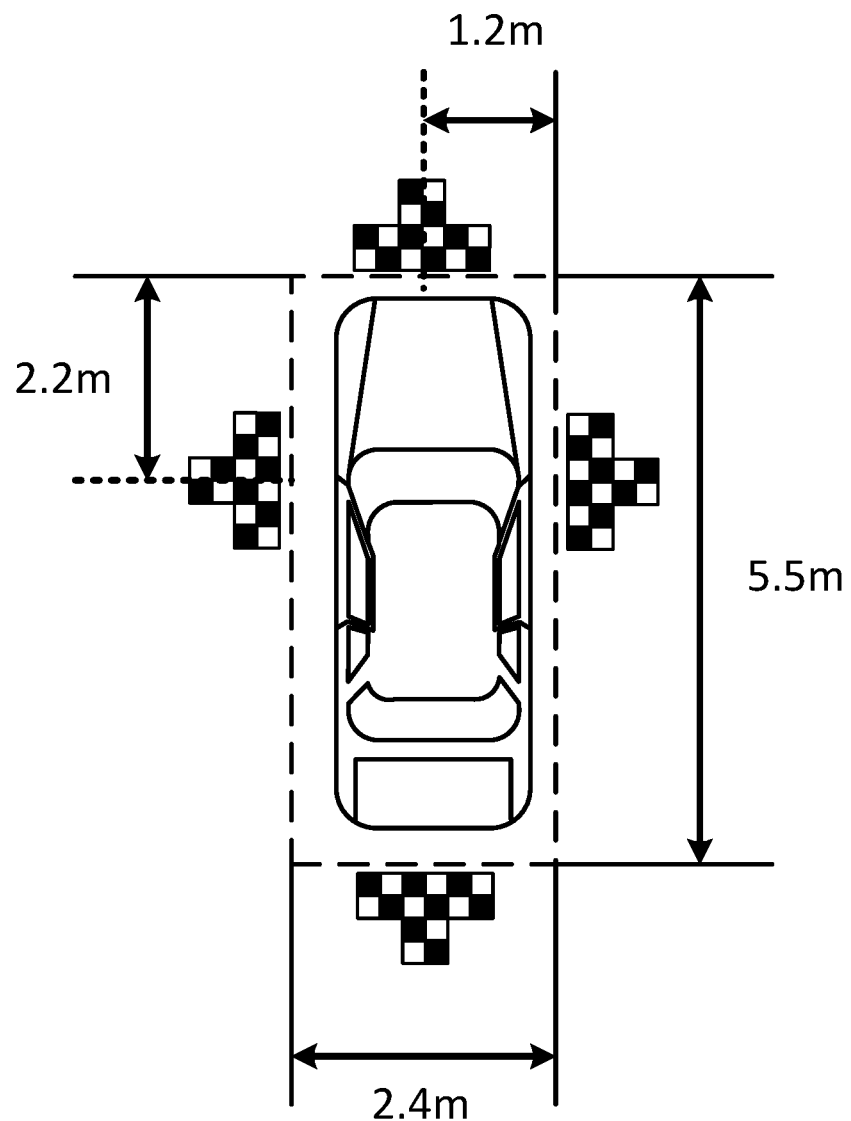

FIG. 3(b) illustrates an example of the vehicle system in section 300-1 from FIG. 3(a). In this example configuration of a vehicle system as illustrated in FIG. 1(a), the vehicle has the surround eye camera system installed involving four monocular cameras, one on each bumper and one on each side mirror. Each frame of the live video captured by the cameras is stitched together by a microprocessor on the surround eye ECU to provide a 360 degree top view image of the car as shown in FIG. 3(b). The center point of the vehicle is already known by the AD ECU and this is treated as the origin of the coordinate system used to find the distance from the vehicle to the center of the marker.

FIGS. 4(a) to 4(d) illustrate example flow diagrams that can be executed by the vehicle system or the management apparatus. The flow diagrams as described can be conducted by the AD ECU of the vehicle system, or in conjunction with the management apparatus depending on the desired implementation.

FIG. 4(a) illustrates an example flow for a vehicle system, in accordance with an example implementation. Specifically, FIG. 4(a) illustrates an example flow for road marker detection in which the flow process from 401 to 405 illustrate an example process for finding a marker, the flow from 407 to 409 illustrate an example flow for finding the center of the marker, and the flow at 410 illustrates an example process to find the distance from the vehicle system to the marker. In an example implementation as described with respect to FIG. 3(b), all four monocular cameras follow a recognition process in succession to deliver the position and orientation as the final output via CAN, however the following flow can be executed for any desired configuration of the vehicle system as described in FIG. 1(a).

The flow proceeds with the camera system (e.g., surround view camera system) provides a top view image at 400, wherein the process attempts to find a marker in a given frame through extracting a region from the frame for processing at 401. Each image frame obtained from the surround eye ECU undergoes smoothing using a low-pass kernel filter {7,7,7,7,8,7,7,7,7} which helps decrease the noise in the image at 402. This smoothed image is then converted to a binary image using any technique according to the desired implementation (e.g., such as Bradley's Adaptive Thresholding) for further processing at 403. Consequently, template matching is performed on this binary image using a template image that is created in parallel at 404. The match obtained from template matching is treated as a potential marker candidate in the frame or not based on a pre-determined threshold.

Figure 3C:
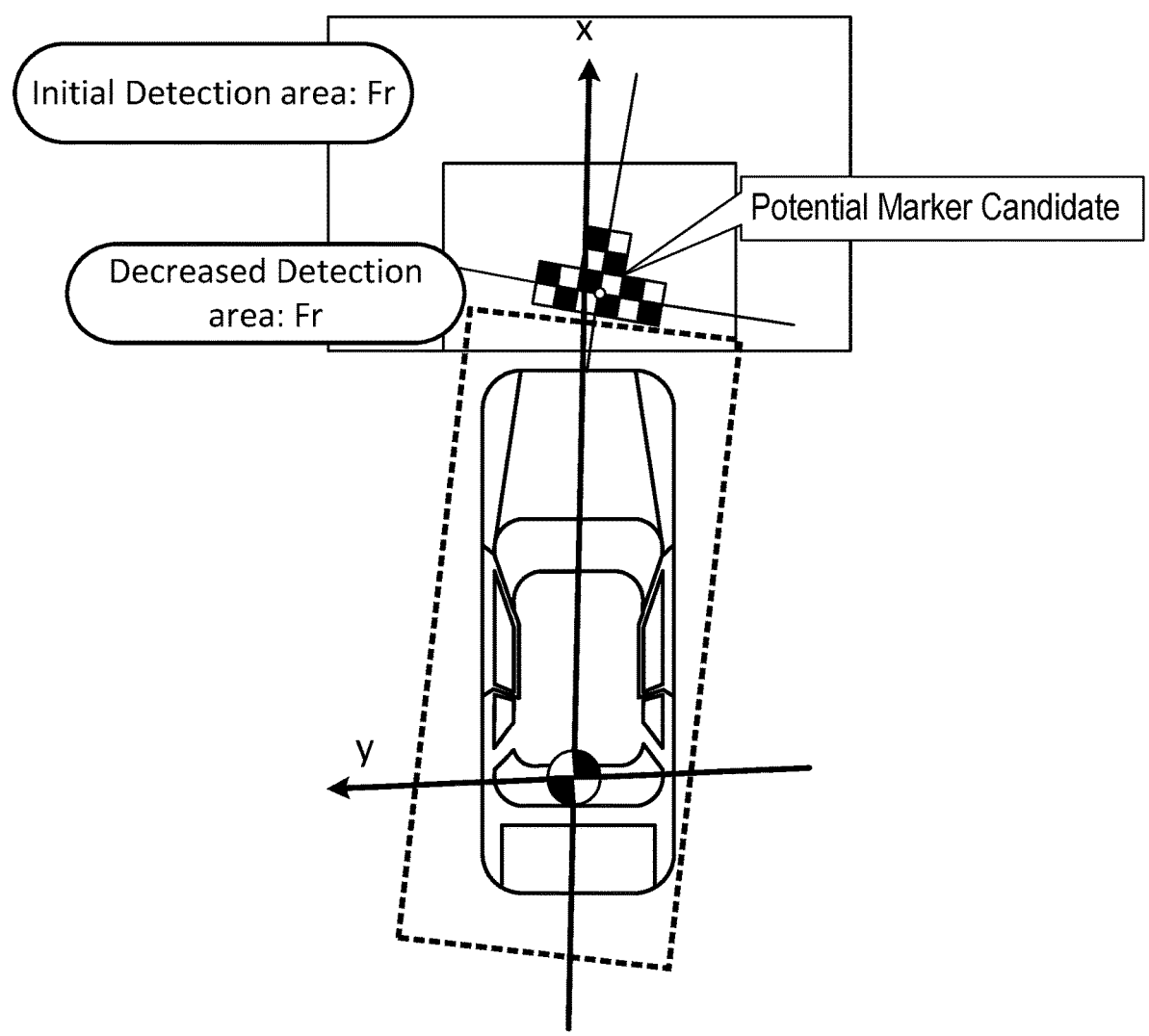

At 405, a determination is made as to whether a potential marker candidate is found. If no marker is found (No), then the process proceeds to the next frame at 406 and returns to the process at 401. If a potential marker candidate is found in the frame (Yes), then the process proceeds to 407, wherein the flow detection region in the frame is narrowed down (template region) to limit the possibility of a false detection as shown in FIG. 3(c).

On this narrowed down detection region, the desired corner detection algorithm such as the Harris Corner detection method is utilized to find all corners at 408. In an example implementation, utilizing the Harris Corner detection method ensures that a point of transition is qualified as a corner based on how it evaluates against a pre-determined threshold. The number of corners obtained in the binary object is compared against the threshold number of corners expected in the T-shaped marker (i.e. 27). In an example implementation, if the number of corners is found to be higher than 23 but less or equal to 27, then the binary object is qualified as the marker. However, other thresholds can be utilized depending on the shape of the asymmetrical marker (e.g., L-shaped, Z-shaped, etc.), and the present disclosure is not limited thereto. If the number of corners does not meet the desired threshold (No), then the process proceeds to the next frame at 406 and returns to 401. Otherwise (Yes), the process proceeds to 409 to find the center of the marker.

Figure 3D:
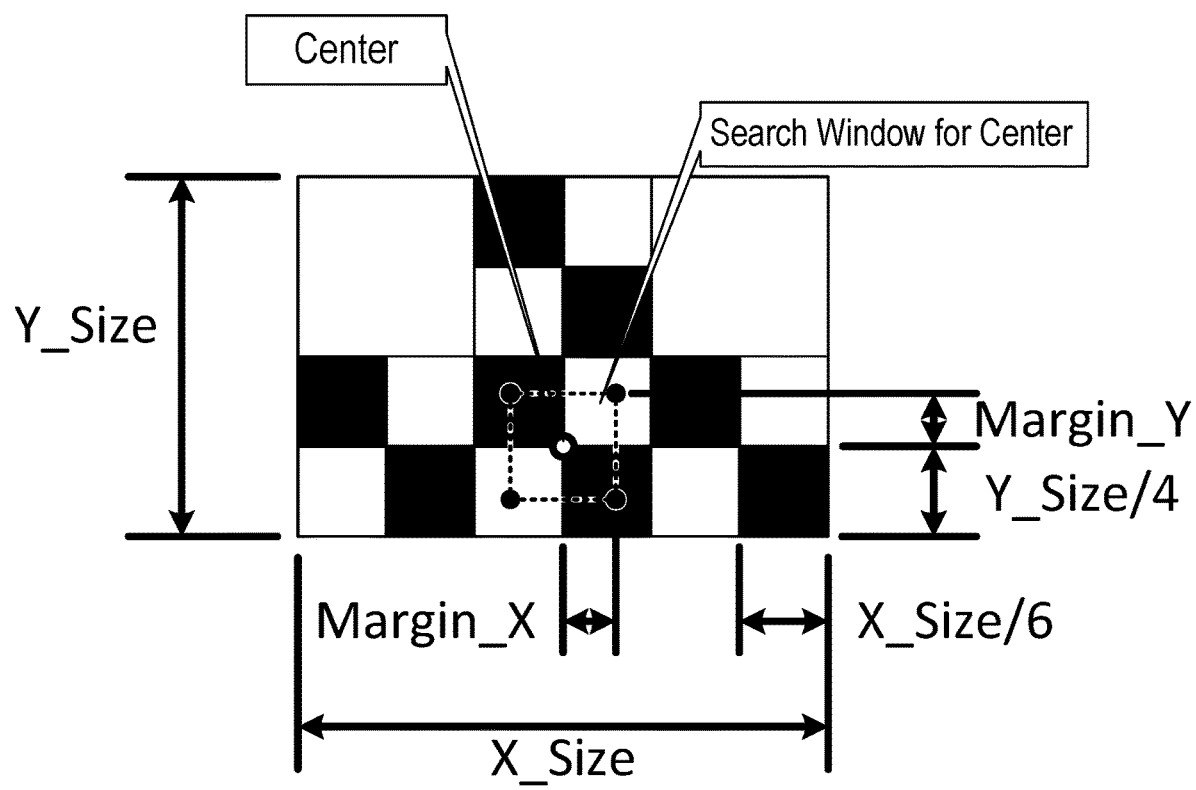

At 409, the process finds the center of the marker for which the coordinates of the template region and corners obtained from template matching and Harris detection respectively are used. As shown in FIG. 3(d), four points surrounding the center are obtained by mathematical operation on the dimensions of the template region window to define a square-shaped search window for the center. The corner coordinates output from Harris detection are iterated over, to find the coordinate that lies in this search window and the point obtained is the center of the marker.

At 410, the process finds the distance of the car from the center which is obtained by applying the distance formula to this corner coordinate and the car origin coordinate. Then at 411, the distance is compared to the map to determine the difference and derive the position.

Through the flow of FIG. 4(a), if the template matching does not find an accurate candidate or if the number of corners detected by corner detection is greater than the number of expected corners, then the current video frame is regarded as unsuitable and the AD ECU gets feedback to proceed to the next frame. Thus, in the event that a marker is not detected with the desired accuracy, a no-detection result is given a higher priority than false detection.

The vehicle position coordinates obtained from the Road Marker Detection method are first used by the AD ECU to determine orientation of the vehicle and then for trajectory correction. The AD ECU is provided the default global coordinates of the markers by the map positioning unit. If the vehicle follows a trajectory along points other than the pre-decided coordinates, the Road Marker Detection method can be used to identify the difference. Based on this difference in position along with the difference in orientation, the actuators are commanded by the ECU to make up for the difference during navigation by adjusting position, orientation, and/or speed of the vehicle as necessary. This method also permits the control center to ensure that two vehicles never collide in the parking lot or in other scenarios, such as a toll gate or locations where autonomous driving is engaged. Thus, through FIG. 4(a), the vehicle system can thereby adjust at least one of a position, orientation, and speed from the calculated distance and/or instructions associated with the detected marker. The instructions can be pre-stored in the vehicle system of FIG. 1(a) or transmitted from a management apparatus 102 as illustrated in FIG. 1(b).

Figure 4B:
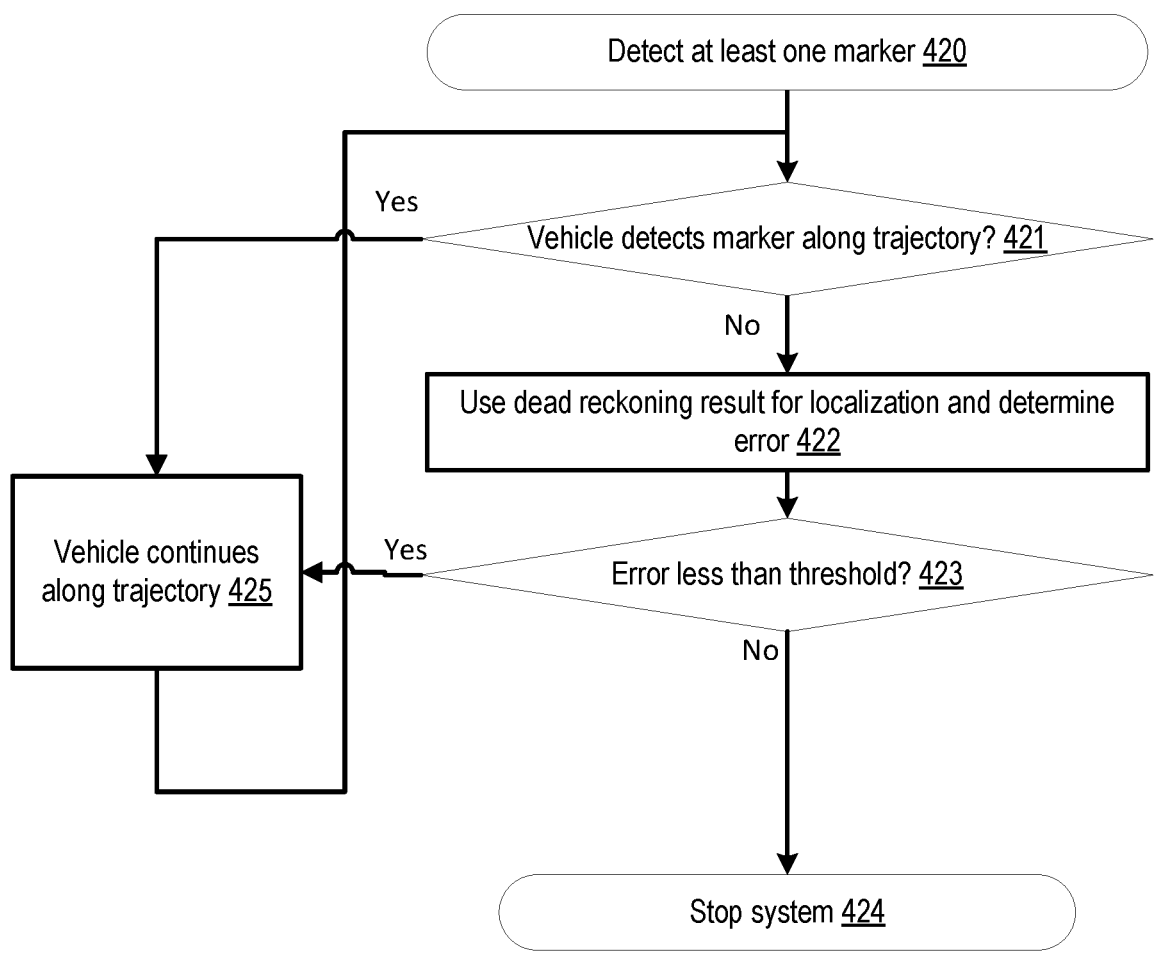

FIG. 4(b) illustrates an example flow for handling non-detection of a marker after the autonomous system is engaged through detecting a marker. In this example flow, the autonomous system is engaged at 420 when a marker is detected, either automatically or through a manual instruction within the vehicle system to engage the autonomous system in response to marker detection. At 421, the vehicle system will proceed along the trajectory and speed indicated by the initial detect marker while attempting to detect a marker along the trajectory. The detecting can occur based on proceeding along the provided trajectory until another marker is expected. If a marker is detected (Yes), then the vehicle continues along the trajectory at 425 or adjusts the trajectory based on instructions associated with the detected marker. Otherwise (No) the process proceeds to 422 to utilize dead reckoning results for conducting localization and determine the error of the results from dead reckoning to the expected location of the marker. In such an example implementation, the vehicle system interpolates the current position of the vehicle based on the current speed and orientation of the vehicle system. At 423, a determination is made as to whether the error is less than a certain threshold (e.g., within a certain expected distance of the expected marker). If so (Yes), then the vehicle continues along the trajectory at 425 or adjusts the orientation/speed of the vehicle to correct for the error, otherwise (No) the flow proceeds to 424 and stops the autonomous mode. In such an example implementation, the system may be stopped by switching the vehicle to an emergency mode which causes the vehicle to proceed to a safe location and transmit instructions to the management apparatus 102 regarding the situation, or can be switched back to human operation mode with an alert to the human operator depending on the desired implementation.

Figure 4C:
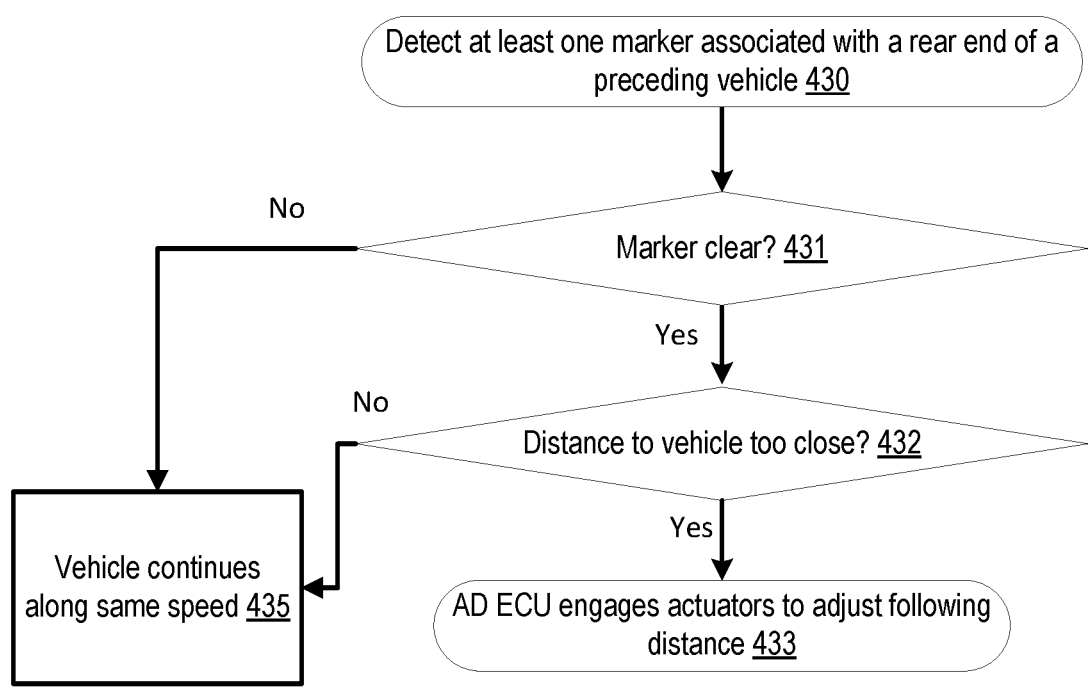

FIG. 4(c) illustrates an example flow for applying markers for tailgating detection, in accordance with an example implementation. If a vehicle that is following another can discern the marker at the rear end of the preceding vehicle, the implication is that the vehicle is too close to the preceding vehicle, and the distance between vehicles should be increased. Such functionality can be useful in stop and go traffic. At 430, the vehicle detects at least one marker associated with a rear end of a preceding vehicle. For example, in the example of FIG. 3(a), the vehicle in section 300-2 is a vehicle that precedes the vehicle of section 300-1. As both vehicles are navigating in the same trajectory, there is a possibility that the vehicle of section 300-1 may tailgate the vehicle in section 300-2.

At 431, a determination is made as to whether the marker was detected with sufficient clarity to indicate that the vehicle is tailgating another vehicle. If so (Yes), then the flow proceeds to 432, otherwise (No), the flow proceeds to 435 wherein the vehicle continues along the same speed. In an example implementation, clarity can be determined from the resolution of the detected marker (e.g., trigger upon the pixel resolution of the marker reaching a determined threshold), from the size of a marker (e.g., trigger upon the size of the marker exceeding a determined threshold), or through other methods in accordance with the desired implementation.

At 432, a determination is made as to whether the distance to the next vehicle is too close (e.g., the distance is within a threshold preset safety distance). If so (Yes), then the flow proceeds to 433 wherein the AD ECU engages the actuators to adjust the vehicle in order to change the distance between the vehicles. Otherwise (No), the flow proceeds to 435. Depending on the desired implementation, this decision process can be made the same as the flow at 431 and omitted. In other example implementations, distance can be determined from radar systems as described with respect to FIG. 1(a), from instructions received from the management apparatus 102 regarding the distance between the vehicles, or through other implementations depending on the desired implementation.

Figure 4D:
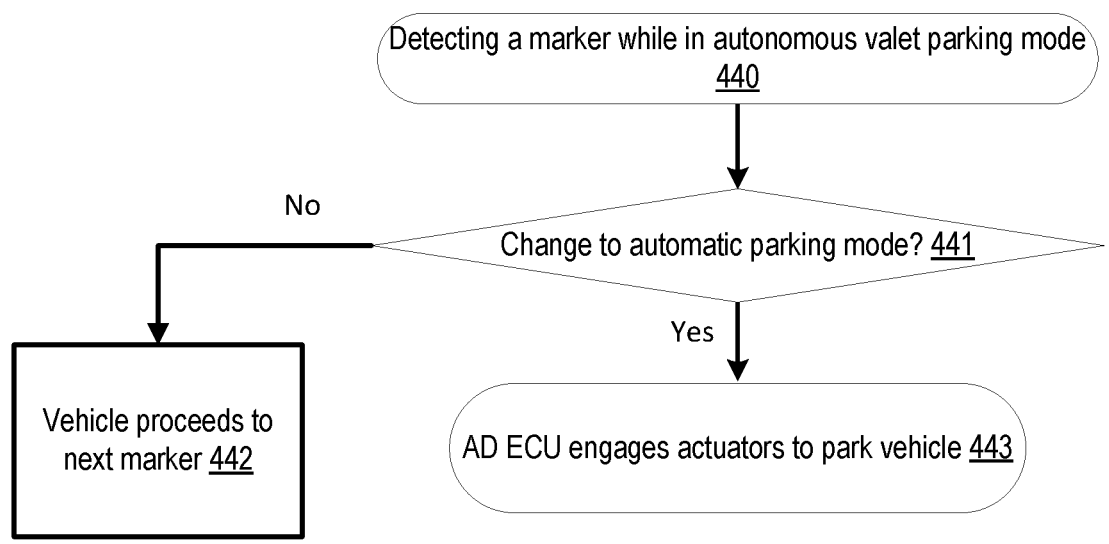

FIG. 4(d) illustrates an example flow diagram for AVP, in accordance with an example implementation. As illustrated in FIG. 3(a), upon entering a parking lot at section 300-1, AVP mode can be engaged by the vehicle system, whereupon the vehicle will proceed along a trajectory associated with the marker based on the instructions received by a management apparatus 102 or as pre-programmed in the AD ECU. At 440, the vehicle proceeds along the trajectory and detects a subsequent marker while in AVP mode. At 441, a determination is made as to whether the marker is indicative of a change for the vehicle from the AVP mode to an automatic parking mode. The determination can be conducted based on pre-programmed instructions associated with the referenced marker, or can be provided by management apparatus 102. If so (Yes), then the vehicle is changed to automatic parking mode at 443, and the AD ECU is configured to automatically park the vehicle into an available parking space as illustrated in section 300-4 from FIG. 3(a). Otherwise (No), the vehicle proceeds to the next marker at 442. The AD ECU can automatically park the vehicle based on instructions received from a management apparatus 102 to determine which parking space is available, along with the corresponding instructions to navigate to the empty parking space.

Figure 5A:
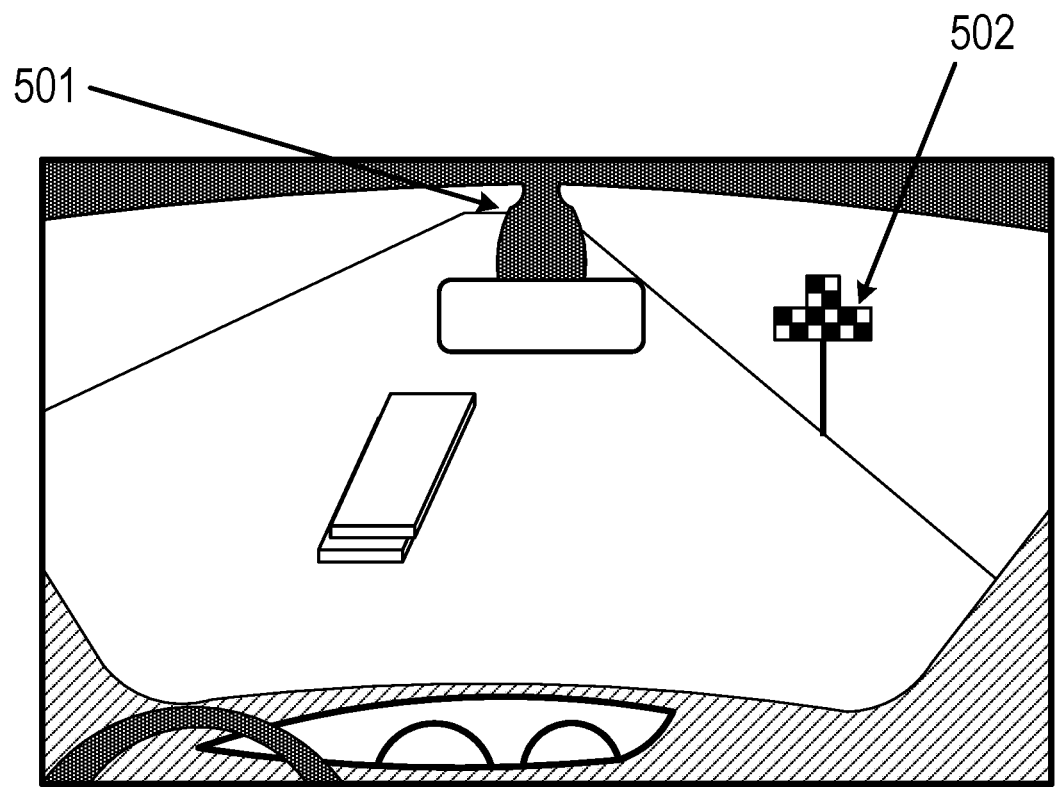
FIGS. 5(a) to 5(b) illustrate example use cases of asymmetrical markers, in accordance with an example implementation.

FIG. 5(a) illustrates an example implementation involving markers utilized as signs. In the above-mentioned example implementations, markers are placed on a 2-D road surface and recognized by a plurality of cameras such as surround eye cameras. However, other example implementations are also possible and the present disclosure is not limited thereto. FIG. 5(a) illustrates another example implementation involving 3-D road signs that can be used independently or in conjunction with the example implementations as described herein. Such implementations can assist with localization of the vehicle and can also indicate coordinates representative of a stop sign or other signs associated with a map. In such example implementations, any suitable camera system that also incorporates depth information can be utilized for recognition and detection of such 3-D road signs. Such camera systems can include stereo cameras or other cameras according to the desired implementation. In the example as described herein, a stereo camera 501 is included on the rear view mirror of the vehicle to detect asymmetrical markers 502 that are used as, or on, road signs or walls, or on monitors or bill boards. In such a manner, markers can be changed as needed through changing the signs or how the marker is displayed on the monitor.

Figure 5B:
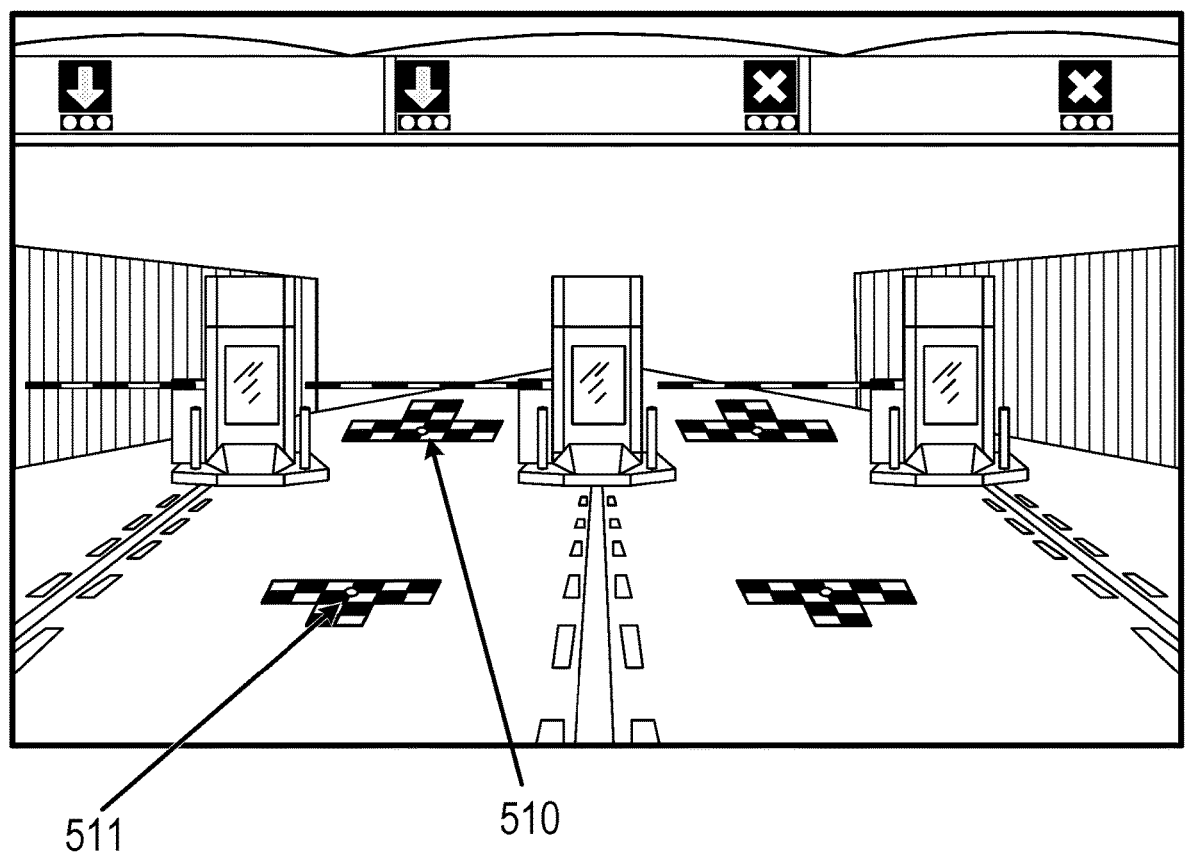

FIG. 5(b) illustrates an example implementation involving a toll gate. When the vehicle system is about to pass the toll gate, its orientation needs to be accurate in order to avoid scraping the sides of the vehicle system. If there are markers placed in the area before and after the gate, the vehicle can be put into autonomous mode and navigate accurately by calculating its position and performing trajectory correction as necessary. In the example of FIG. 5(b), the autonomous mode is initiated once the marker at 511 is detected. The vehicle system then follows a trajectory through the toll gate and proceeds according to a set of instructions provided by the management apparatus 102 or by instructions stored in the vehicle system regarding how to proceed through a toll gate. Once the vehicle system reaches marker 510, the operation mode switches to human operated mode, wherein the human operator resumes operation of the vehicle system. Markers can be painted on the roads or projected from light systems in the toll gate so that the markers can be modified as needed.

FIG. 6 illustrates example management information, in accordance with an example implementation. Specifically, FIG. 6 illustrates an example index of markers that are placed for one or more locations to assist in the functionality of the autonomous modes of the vehicle. Management information may be maintained on the vehicle system side in map positioning unit 6 or in management apparatus 102 depending on the desired implementation. In the example of FIG. 6, management information can include marker ID, marker type, map information, operation mode, and instructions. Marker ID is the unique identifier corresponding to the detected marker. Marker type indicates the template type that the marker belongs to (e.g., T-shaped, Z-shaped, L-shaped, etc. as illustrated in FIG. 2(b)) and the template types are utilized to determine whether an initial marker is detected or not. Map information indicates the corresponding location on a map (e.g., geographical coordinates, latitude/longitude coordinates, geographical information system waypoint coordinates, etc.) for the marker ID. Operation mode is indicative of a mode of operation for the vehicle, such as human operated mode and various autonomous modes (e.g., AVP mode, automatic parking mode, toll gate mode, tailgate detection mode, etc.). Instructions are instructions associated with a marker ID can include trajectory information for proceeding to the next marker, instructions to transmit to a management apparatus and receive instructions regarding navigation, instructions for adjusting position, orientation, and/or speed of a vehicle, and so on according to the desired implementation.

Figure 7:
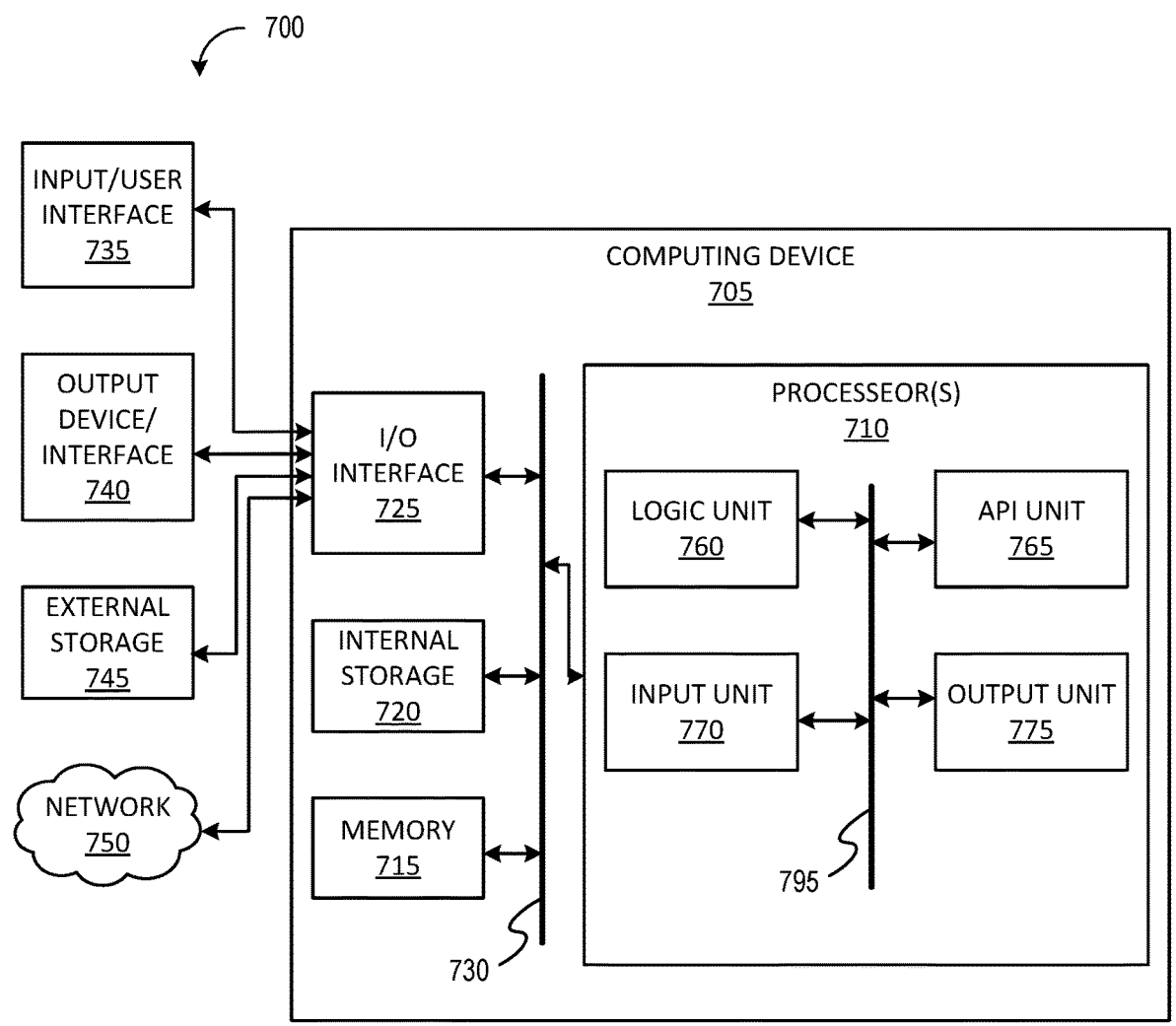
FIG. 7 illustrates an example computing environment with an example computer device suitable for use in some example implementations.

FIG. 7 illustrates an example computing environment with an example computer device suitable for use in some example implementations, such as for facilitating functionality to an AD ECU 1 and map positioning unit 6 of a vehicle system as illustrated in FIG. 1(a), or a management apparatus 102 as illustrated in FIG. 1(b). All functions described herein can be implemented at the management apparatus 102, at the vehicle system, or through a system based on some combination of such elements, depending on the desired implementation.

Computer device 705 in computing environment 700 can include one or more processing units, cores, or processors 710, memory 715 (e.g., RAM, ROM, and/or the like), internal storage 720 (e.g., magnetic, optical, solid state storage, and/or organic), and/or I/O interface 725, any of which can be coupled on a communication mechanism or bus 730 for communicating information or embedded in the computer device 705. I/O interface 725 is also configured to receive images from cameras or provide images to projectors or displays, depending on the desired implementation.

Computer device 705 can be communicatively coupled to input/user interface 735 and output device/interface 740. Either one or both of input/user interface 735 and output device/interface 740 can be a wired or wireless interface and can be detachable. Input/user interface 735 may include any device, component, sensor, or interface, physical or virtual, that can be used to provide input (e.g., buttons, touch-screen interface, keyboard, a pointing/cursor control, microphone, camera, braille, motion sensor, optical reader, and/or the like). Output device/interface 740 may include a display, television, monitor, printer, speaker, braille, or the like. In some example implementations, input/user interface 735 and output device/interface 740 can be embedded with or physically coupled to the computer device 705. In other example implementations, other computer devices may function as or provide the functions of input/user interface 735 and output device/interface 740 for a computer device 705.

Examples of computer device 705 may include, but are not limited to, highly mobile devices (e.g., smartphones, devices in vehicles and other machines, devices carried by humans and animals, and the like), mobile devices (e.g., tablets, notebooks, laptops, personal computers, portable televisions, radios, and the like), and devices not designed for mobility (e.g., desktop computers, other computers, information kiosks, televisions with one or more processors embedded therein and/or coupled thereto, radios, and the like).

Computer device 705 can be communicatively coupled (e.g., via I/O interface 725) to external storage 745 and network 750 for communicating with any number of networked components, devices, and systems, including one or more computer devices of the same or different configuration. Computer device 705 or any connected computer device can be functioning as, providing services of, or referred to as a server, client, thin server, general machine, special-purpose machine, or another label.

I/O interface 725 can include, but is not limited to, wired and/or wireless interfaces using any communication or I/O protocols or standards (e.g., Ethernet, 802.11x, Universal System Bus, WiMax, modem, a cellular network protocol, and the like) for communicating information to and/or from at least all the connected components, devices, and network in computing environment 700. Network 750 can be any network or combination of networks (e.g., the Internet, local area network, wide area network, a telephonic network, a cellular network, satellite network, and the like).

Computer device 705 can use and/or communicate using computer-usable or computer-readable media, including transitory media and non-transitory media. Transitory media include transmission media (e.g., metal cables, fiber optics), signals, carrier waves, and the like. Non-transitory media include magnetic media (e.g., disks and tapes), optical media (e.g., CD ROM, digital video disks, Blu-ray disks), solid state media (e.g., RAM, ROM, flash memory, solid-state storage), and other non-volatile storage or memory.

Computer device 705 can be used to implement techniques, methods, applications, processes, or computer-executable instructions in some example computing environments. Computer-executable instructions can be retrieved from transitory media, and stored on and retrieved from non-transitory media. The executable instructions can originate from one or more of any programming, scripting, and machine languages (e.g., C, C++, C #, Java, Visual Basic, Python, Perl, JavaScript, and others).

Processor(s) 710 can execute under any operating system (OS) (not shown), in a native or virtual environment. One or more applications can be deployed that include logic unit 760, application programming interface (API) unit 765, input unit 770, output unit 775, and inter-unit communication mechanism 795 for the different units to communicate with each other, with the OS, and with other applications (not shown). The described units and elements can be varied in design, function, configuration, or implementation and are not limited to the descriptions provided.

In some example implementations, when information or an execution instruction is received by API unit 765, it may be communicated to one or more other units (e.g., logic unit 760, input unit 770, output unit 775). In some instances, logic unit 760 may be configured to control the information flow among the units and direct the services provided by API unit 765, input unit 770, output unit 775, in some example implementations described above. For example, the flow of one or more processes or implementations may be controlled by logic unit 760 alone or in conjunction with API unit 765. The input unit 770 may be configured to obtain input for the calculations described in the example implementations, and the output unit 775 may be configured to provide output based on the calculations described in example implementations.

Memory 715 can be used in conjunction with external storage 745 to function as map positioning unit 6 and configured to manage management information as illustrated in FIG. 6. Through such implementations, AD ECU 1 can manage various operation modes of the vehicle system as illustrated in FIG. 1(a).

Processor(s) 710 can be configured to execute the flow diagrams from FIGS. 4(a) to 4(d) and refer to management information in FIG. 6. In an example implementation, processor(s) 710 can be configured to detect, from a plurality of cameras, one or more markers having an asymmetrical shape; and change an operation mode from a human operated mode to an autonomous mode for a vehicle, the autonomous mode configured to adjust at least one of a position, orientation, and speed of the vehicle based on the detected one or more markers as described in FIG. 4(a).

In an example implementation, processor(s) 710 can be configured to, for the autonomous mode being an autonomous valet parking (AVP) mode, adjust the at least one of the position, orientation and speed of the vehicle according to a trajectory associated with the detected one or more markers; navigating the vehicle along the trajectory until second one or more markers is detected; and for the another one or more markers indicative of a change in the trajectory, changing the at least one of the position, orientation, and speed of the vehicle according to the change in the trajectory as described, for example, in FIGS. 3(a) to 3(d) and FIGS. 4(a) to 4(d). For the second one or more markers indicative of instructions to park the vehicle, processor(s) 710 can be configured to transmit a position of the vehicle to a management apparatus; and upon receipt of an instruction from the management apparatus to change the operation mode from the AVP mode to an automatic parking mode, switching the operation mode from the AVP mode to the automatic parking mode, wherein the automatic parking mode is configured to conduct automatic parking of the vehicle into a parking space as described with respect to FIG. 4(d).

In an example implementation when processor(s) 710 are facilitating the functionality of the AD ECU, processor(s) 710 are configured to manage the operation mode and to adjust the at least one of a position, orientation, and speed of the vehicle through controlling one or more actuators of the vehicle as described with respect to the vehicle system of FIG. 1(a).

In an example implementation, processor(s) 710 can be configured to detect, from the plurality of cameras, one or more markers having the asymmetrical shape through performing template matching on one or more images received from the plurality of cameras; for the template matching indicative of the one or more markers being present in the one or more images, conducting corner detection on the one or more images; and for the corner detection indicative of a number of corners meeting a determined threshold, calculating a distance from the vehicle to the one or more markers from the one or more images as described with respect to FIG. 4(a).

In an example implementation, processor(s) 710 can be configured to, while the operation of the vehicle is in the autonomous mode, on failure to detect an expected marker based on the trajectory of the vehicle, interpolate a current position of the vehicle and determine an error between the current position of the vehicle and a position of the expected marker; and for the error being larger than a threshold, ending the autonomous mode of the vehicle as described in FIG. 4(b).

In an example implementation, processor(s) 710 can be configured to manage a relationship between a plurality of markers and a map as illustrated in FIG. 6, and be further configured to, for the vehicle having an operation mode of the autonomous mode, transmit a position of the vehicle to a management apparatus, the position calculated based on the relationship between the detected one or more markers and the map; and upon receiving trajectory information from the management apparatus, the instructions indicative of a trajectory for the vehicle, adjusting at least one of the position, orientation, and speed of the vehicle according to the trajectory information as described with respect to FIG. 1(b).

Some portions of the detailed description are presented in terms of algorithms and symbolic representations of operations within a computer. These algorithmic descriptions and symbolic representations are the means used by those skilled in the data processing arts to convey the essence of their innovations to others skilled in the art. An algorithm is a series of defined steps leading to a desired end state or result. In example implementations, the steps carried out require physical manipulations of tangible quantities for achieving a tangible result.

Unless specifically stated otherwise, as apparent from the discussion, it is appreciated that throughout the description, discussions utilizing terms such as "processing," "computing," "calculating," "determining," "displaying," or the like, can include the actions and processes of a computer system or other information processing device that manipulates and transforms data represented as physical (electronic) quantities within the computer system's registers and memories into other data similarly represented as physical quantities within the computer system's memories or registers or other information storage, transmission or display devices.

Example implementations may also relate to an apparatus for performing the operations herein. This apparatus may be specially constructed for the required purposes, or it may include one or more general-purpose computers selectively activated or reconfigured by one or more computer programs. Such computer programs may be stored in a computer readable medium, such as a computer-readable storage medium or a computer-readable signal medium. A computer-readable storage medium may involve tangible mediums such as, but not limited to optical disks, magnetic disks, read-only memories, random access memories, solid state devices and drives, or any other types of tangible or non-transitory media suitable for storing electronic information. A computer readable signal medium may include mediums such as carrier waves. The algorithms and displays presented herein are not inherently related to any particular computer or other apparatus. Computer programs can involve pure software implementations that involve instructions that perform the operations of the desired implementation.

Various general-purpose systems may be used with programs and modules in accordance with the examples herein, or it may prove convenient to construct a more specialized apparatus to perform desired method steps. In addition, the example implementations are not described with reference to any particular programming language. It will be appreciated that a variety of programming languages may be used to implement the teachings of the example implementations as described herein. The instructions of the programming language(s) may be executed by one or more processing devices, e.g., central processing units (CPUs), processors, or controllers.

As is known in the art, the operations described above can be performed by hardware, software, or some combination of software and hardware. Various aspects of the example implementations may be implemented using circuits and logic devices (hardware), while other aspects may be implemented using instructions stored on a machine-readable medium (software), which if executed by a processor, would cause the processor to perform a method to carry out implementations of the present application. Further, some example implementations of the present application may be performed solely in hardware, whereas other example implementations may be performed solely in software. Moreover, the various functions described can be performed in a single unit, or can be spread across a number of components in any number of ways. When performed by software, the methods may be executed by a processor, such as a general purpose computer, based on instructions stored on a computer-readable medium. If desired, the instructions can be stored on the medium in a compressed and/or encrypted format.

Moreover, other implementations of the present application will be apparent to those skilled in the art from consideration of the specification and practice of the teachings of the present application. Various aspects and/or components of the described example implementations may be used singly or in any combination. It is intended that the specification and example implementations be considered as examples only, with the true scope and spirit of the present application being indicated by the following claims.

What is claimed is:

1. A method, comprising:
    detecting, from a plurality of cameras, one or more markers having an asymmetrical shape such that an outline of the asymmetrical shape is asymmetrical with respect to a zero degree orientation and a 180 degree orientation such that a direction of approach to the asymmetrical shape can be distinguished between the zero degree orientation and the 180 degree orientation, wherein the outline of the asymmetrical shape comprises a plurality of corners; and
    changing an operation mode from a human operated mode to an autonomous mode for a vehicle, the autonomous mode configured to adjust at least one of a position, orientation, or speed of the vehicle based on the detected one or more markers;
    wherein the detecting, from the plurality of cameras, the one or more markers having the asymmetrical shape comprises:
        receiving one or more images from the plurality of cameras;
        performing template matching, within a first region of each the one or more images, on the one or more images received from the plurality of cameras;
        for the template matching indicative of the one or more markers being present in the one or more images, conducting a first corner detection on the one or more images to detect one or more of the plurality of corners, the first corner detection is conducted within a second region of each of the one or more images, the second region being smaller than the first region;
        for the corner detection indicative of a number of the detected one or more of the plurality of corners meeting a threshold, defining a third region of each of the one or more images that is smaller than the second region, the third region surrounding a center of the one or more marker based on dimensions of the second region;
        conducting a second corner detection on the one or more image within the third region to detect the center of the one or more markers; and
        calculating a distance from the vehicle to the center of the one or more markers from the one or more images.

2. The method of claim 1,
    wherein the autonomous mode is an autonomous valet parking (AVP) mode, wherein the method further comprises:
        adjusting the at least one of the position, orientation, or speed of the vehicle according to a trajectory associated with the detected one or more markers;
        navigating the vehicle along the trajectory until another one or more markers is detected; and
        for the another one or more markers indicative of a change in the trajectory, changing the at least one of the position, orientation, or speed of the vehicle according to the change in the trajectory.

3. The method of claim 2, wherein for the another one or more markers indicative of instructions to park the vehicle:
    transmitting the position of the vehicle to a management apparatus; and
    upon receipt of an instruction from the management apparatus to change the operation mode from the AVP mode to an automatic parking mode, switching the operation mode from the AVP mode to the automatic parking mode, wherein the automatic parking mode is configured to conduct automatic parking of the vehicle into a parking space.

4. The method of claim 1, wherein the operation mode is managed by an Autonomous Driving Electronic Control Unit (AD ECU) configured to adjust the at least one of a position, orientation, or speed of the vehicle through controlling one or more actuators of the vehicle.

5. The method of claim 1, further comprising, while the operation mode of the vehicle is in the autonomous mode:
    causing the vehicle to proceed along a trajectory until another marker is expected; and
    on failure to detect the another marker:
        interpolating a current position of the vehicle and determine an error between the current position of the vehicle and a position of the another marker; and
        for the error being larger than a threshold, ending the autonomous mode of the vehicle.

6. The method of claim 1, wherein the vehicle is configured to manage a relationship between a plurality of markers and a map, and wherein the method further comprises:
    for the vehicle having the operation mode of the autonomous mode, transmitting the position of the vehicle to a management apparatus, the position calculated based on the relationship between the detected one or more markers and the map; and upon receiving trajectory information from the management apparatus, the trajectory information indicative of another trajectory for the vehicle, adjusting the at least one of the position, orientation, or speed of the vehicle according to the trajectory information.

7. The method of claim 1,
wherein performing template matching, within a first region of each the one or more images, on the one or more images received from the plurality of cameras comprises matching a template image with the one or more markers detected in the one or more images, wherein the template image is stored as management information,
wherein the management information comprises plurality of maker identifiers each indicating one of a plurality of template types,
wherein each marker identifier also indicates a corresponding operation mode of the vehicle of a plurality of operation modes and a corresponding instruction.

8. The method of claim 1, wherein each of the one or more markers comprises checker pattern and each of the one or more markers is one of T-shaped, Z-shaped, and L-shaped.

9. A non-transitory computer readable medium, storing instructions executed by one or more hardware processors to perform a process comprising:
detecting, from a plurality of cameras, one or more markers having an asymmetrical shape such that an outline of the asymmetrical shape is asymmetrical with respect to a zero degree orientation and a 180 degree orientation such that a direction of approach to the asymmetrical shape can be distinguished between the zero degree orientation and the 180 degree orientation, wherein the outline of the asymmetrical shape comprises a plurality of corners; and
changing an operation mode from a human operated mode to an autonomous mode for a vehicle, the autonomous mode configured to adjust at least one of a position, orientation, or speed of the vehicle based on the detected one or more markers;
wherein the detecting, from the plurality of cameras, the one or more markers having the asymmetrical shape comprises:
  receiving one or more images from the plurality of cameras;
  performing template matching, within a first region of each the one or more images, on the one or more images received from the plurality of cameras;
  for the template matching indicative of the one or more markers being present in the one or more images, conducting a first corner detection on the one or more images to detect one or more of the plurality of corners, the first corner detection is conducted within a second region of each of the one or more images, the second region being smaller than the first region;
  for the corner detection indicative of a number of the detected one or more of the plurality of corners meeting a threshold, defining a third region of each of the one or more images that is smaller than the second region, the third region surrounding a center of the one or more marker based on dimensions of the second region;
  conducting a second corner detection on the one or more image within the third region to detect the center of the one or more markers; and
  calculating a distance from the vehicle to the center of the one or more markers from the one or more images.

10. The non-transitory computer readable medium of claim 9,
wherein the autonomous mode is an autonomous valet parking (AVP) mode, the process further comprising:
  adjusting the at least one of the position, orientation, or speed of the vehicle according to a trajectory associated with the detected one or more markers;
navigating the vehicle along the trajectory until another one or more markers is detected; and
  for the another one or more markers indicative of a change in the trajectory, changing the at least one of the position, orientation, or speed of the vehicle according to the change in the trajectory.

11. The non-transitory computer readable medium of claim 10, wherein for the another one or more markers indicative of instructions to park the vehicle:
transmitting the position of the vehicle to a management apparatus; and
upon receipt of an instruction from the management apparatus to change the operation mode from the AVP mode to an automatic parking mode, switching the operation mode from the AVP mode to the automatic parking mode, wherein the automatic parking mode is configured to conduct automatic parking of the vehicle into a parking space.

12. The non-transitory computer readable medium of claim 9, wherein the operation mode is managed by an Autonomous Driving Electronic Control Unit (AD ECU) configured to adjust the at least one of a position, orientation, or speed of the vehicle through controlling one or more actuators of the vehicle.

13. The non-transitory computer readable medium of claim 9, the process further comprising, while the operation mode of the vehicle is in the autonomous mode:
causing the vehicle to proceed along a trajectory until another marker is expected; and
on failure to detect the another marker:
interpolating a current position of the vehicle and determine an error between the current position of the vehicle and a position of the another marker; and
for the error being larger than a threshold, ending the autonomous mode of the vehicle.

14. The non-transitory computer readable medium of claim 9, wherein the vehicle is configured to manage a relationship between a plurality of markers and a map, and wherein the instructions further comprise:
for the vehicle having the operation mode of the autonomous mode, transmitting the position of the vehicle to a management apparatus, the position calculated based on the relationship between the detected one or more markers and the map; and
upon receiving trajectory information from the management apparatus, the trajectory information indicative of another trajectory for the vehicle, adjusting the at least one of the position, orientation, or speed of the vehicle according to the trajectory information.

15. A system, comprising:
a plurality of cameras; and
a processor, configured to:
  detect, from the plurality of cameras, one or more markers having an asymmetrical shape such that an outline of the asymmetrical shape is asymmetrical with respect to a zero degree orientation and a 180 degree orientation such that a direction of approach to the asymmetrical shape can be distinguished between the zero degree orientation and the 180 degree orientation; and change an operation mode from a human operated mode to an autonomous mode for a vehicle, the autonomous mode configured to adjust at least one of a position, orientation, or speed of the vehicle based on the detected one or more markers;

wherein the processor is configured to detect, from the plurality of cameras, the one or more markers having the asymmetrical shape by:

receiving one or more images from the plurality of cameras;

performing template matching, within a first region of each the one or more images, on the one or more images received from the plurality of cameras;

for the template matching indicative of the one or more markers being present in the one or more images, conducting a first corner detection on the one or more images to detect one or more of the plurality of corners, the first corner detection is conducted within a second region of each of the one or more images, the second region being smaller than the first region;

for the corner detection indicative of a number of the detected one or more of the plurality of corners meeting a threshold, defining a third region of each of the one or more images that is smaller than the second region, the third region surrounding a center of the one or more marker based on dimensions of the second region;

conducting a second corner detection on the one or more image within the third region to detect the center of the one or more markers; and calculating a distance from the vehicle to the center of the one or more markers from the one or more images.

16. The system of claim 15, wherein the autonomous mode is an autonomous valet parking (AVP) mode, wherein the processor is configured to:

adjust the at least one of the position, orientation, or speed of the vehicle according to a trajectory associated with the detected one or more markers;

navigate the vehicle along the trajectory until another one or more markers is detected; and for the another one or more markers indicative of a change in the trajectory, change the at least one of the position, orientation, or speed of the vehicle according to the change in the trajectory.

17. The system of claim 15, wherein for the another one or more markers indicative of instructions to park the vehicle, the processor is configured to:

transmit the position of the vehicle to a management apparatus; and upon receipt of an instruction from the management apparatus to change the operation mode from the AVP mode to an automatic parking mode, switch the operation mode from the AVP mode to the automatic parking mode, wherein the automatic parking mode is configured to conduct automatic parking of the vehicle into a parking space.

18. The system of claim 15, wherein the processor is an Autonomous Driving Electronic Control Unit (AD ECU) that is configured to manage the operation mode of the vehicle and to adjust the at least one of a position, orientation, or speed of the vehicle through controlling one or more actuators of the vehicle.

19. The system of claim 15, wherein the processor is configured to, while the operation mode of the vehicle is in the autonomous mode:

causing the vehicle to proceed along a trajectory until another marker is expected; and on failure to detect the another marker:

interpolate a current position of the vehicle and determine an error between the current position of the vehicle and a position of the another marker; and for the error being larger than a threshold, ending the autonomous mode of the vehicle.

* * * * *